Aug. 29, 1933.  W. H. HIMMELBERGER  1,924,644
LAWN ROLLER
Filed June 5, 1931
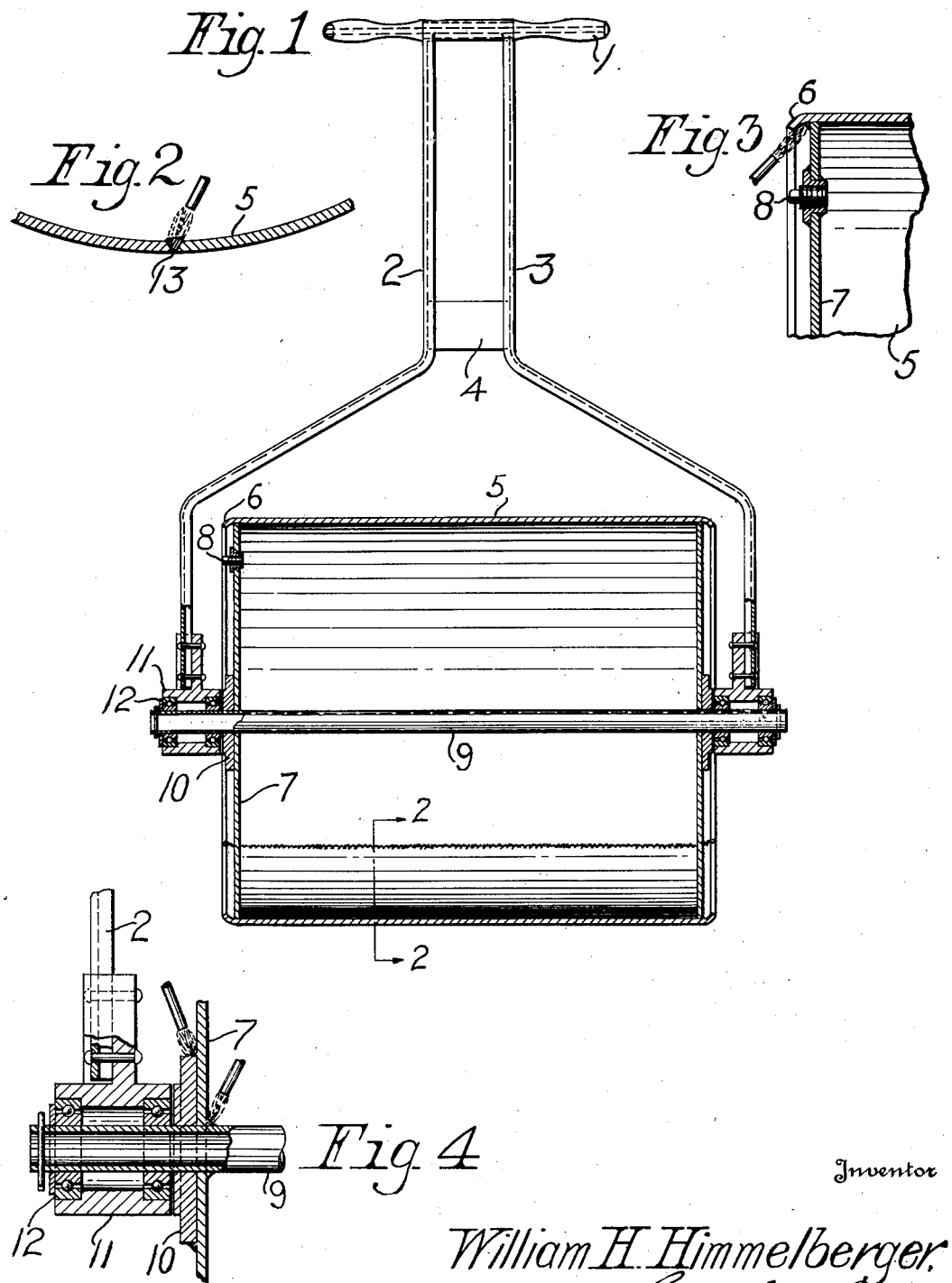
Inventor
William H. Himmelberger
By Samuel H. Davis
Attorney Patented Aug. 29, 1933

1,924,644

UNITED STATES PATENT OFFICE 1,924,644

LAWN ROLLER

William H. Himmelberger, Lansing, Mich., assignor, by mesne assignments, to Harry E. Moore, Lansing, Mich.

Application June 5, 1931. Serial No. 542,413

1 Claim. (Cl. 55—6)

This invention relates to lawn rollers or the like, usable for any purpose for which such devices may be employed, and has for its object the production of a roller comprising parts of special construction and combination, whereby it is believed a structure is formed of a particularly simple nature, easily manufactured and assembled, and capable of withstanding the hardest service for the greatest length of time without attention or repairs.

In the accompanying drawing are illustrated the different parts and their construction and combination is set forth. Of the drawing, Fig. 1 is a vertical longitudinal section of the roller and bearings, and the section includes also a portion of the handle, the remainder of the handle frame being shown in full lines. Fig. 2 is a sectional view showing the electrically welded seam of the drum or roller. Fig. 3 shows the circularly electrically welded edge connection of the head of the roller and cylinder. Fig. 4 is a sectional view showing the circumferential welded connection of the re-enforcing center plate and the head.

Throughout the drawing and description the same number is used to refer to the same part.

Considering the drawing, the handle 1 is secured at the upper ends of the sides 2 and 3 of the handle frame. Those sides are made of channel iron or like metal which is found to afford the greatest strength with the least weight, and the channel iron sides cannot be readily bent or distorted by any amount of rough usage. The channel iron sides are usually connected by a brace plate 4 as set forth.

The roller is comprised of a sheet of metal bent into cylindrical shape designated by number 5, and the end edges of the cylinder thus formed are turned inwardly as edge 6 in Fig. 1. The cylinder has two heads 7 in one of which is a removable screw plug 8 in order that the cylinder may be filled with water for weight in the customary manner. An advantageous feature of the construction of the roller comprises the in-turned circumferential edges 6, best shown in Fig. 3. In actual manufacturing it has been found that the in-turned edges of the cylinder with the heads 7 edge welded inside and near the turned edges 6 materially strengthen the ends of the roller by protecting the welded joint of the roller and heads. The roller has an axis 9 which passes through the cylinder, and through the heads thereof, and also through the center re-enforcing plates 10 carried by the heads exteriorly. Hubs 11 are secured to the lower ends of the sides 2 and 3 of the frame, and the hubs are provided with ball bearings 12 to receive the journals or ends of the axis. It will be observed that the ball bearings 12 are double bearings, and particularly that the ball races are spaced at relatively considerable distances apart on the end of the projecting axis 9. This is intentional and very advantageous in a roller using water as the weight. The surging weight of water during the operation is especially severe on bearings and quickly distorts them. With a plurality of sets of bearings somewhat widely separated on the ends of the axis as illustrated, the displacement of the bearings is greatly reduced and the life of the roller correspondingly extended.

In Fig. 2 will be noted the seam 13 electrically welded, which connects the meetings ends of the sheet of metal of which the roller is formed. Any desired method of welding or cast welding may be employed. In Fig. 3 is shown the circumferential electrically welded junction of the head and cylinder, and in Fig. 4 the like welded edge portion of the re-enforcing plate on the head. Thus welded the parts are found to possess extraordinary strength as a whole, and the construction is the most economical with which this applicant is acquainted.

The operation of this invention is that of an ordinary lawn roller for any kindred purpose.

Having now described this invention, I claim:—

In a lawn roller, the combination of a hollow cylindrical body portion adapted to be filled with water, a removable plug, circular heads in said cylinder, said plug being inserted in one of said heads, an axis passing through the body, bearings carried by the ends of the axis, a handle connected with the said bearings, the said cylindrical portion of the roller having circumferential edges turned inwardly, and the said circular heads having welded joints with said cylindrical portion extending circumferentially within and adjacent to the said inwardly turned end edges of said cylindrical portion.

WILLIAM H. HIMMELBERGER.